United States Patent [19]
Park et al.

[11] Patent Number: 5,340,840
[45] Date of Patent: Aug. 23, 1994

[54] FOAM STRUCTURES OF ETHYLENIC POLYMER MATERIAL HAVING ENHANCED TOUGHNESS AND ELASTICITY AND PROCESS FOR MAKING

[75] Inventors: Chung P. Park, Pickerington, Ohio; James C. Stevens, Midland, Mich.; George W. Knight, Lake Jackson, Tex.

[73] Assignee: The Dow Chemical Company, Midland, Mich.

[21] Appl. No.: 54,330

[22] Filed: Apr. 28, 1993

Related U.S. Application Data

[63] Continuation-in-part of Ser. No. 32,917, Mar. 18, 1993, abandoned.

[51] Int. Cl.$^5$ .............................. C08J 9/18
[52] U.S. Cl. ........................ 521/60; 521/79; 521/143; 521/149
[58] Field of Search ............... 521/60, 79, 143, 149

[56] References Cited

U.S. PATENT DOCUMENTS

| | | | |
|---|---|---|---|
| 4,649,001 | 3/1987 | Nakamura et al. | 264/50 |
| 4,897,455 | 1/1990 | Welborn, Jr. | 526/129 |
| 4,912,075 | 3/1990 | Chang | 502/107 |
| 4,914,253 | 4/1990 | Chang | 585/523 |
| 4,937,301 | 6/1990 | Chang | 526/128 |
| 5,055,438 | 10/1991 | Canich | 502/117 |
| 5,091,435 | 2/1992 | Suzuki et al. | 521/134 |
| 5,272,236 | 12/1993 | Lai et al. | 526/348.3 |

FOREIGN PATENT DOCUMENTS

| | | | |
|---|---|---|---|
| 0206794A1 | 12/1986 | European Pat. Off. | C08F 4/76 |
| 0416815A2 | 3/1991 | European Pat. Off. | C08F 10/00 |
| WO8909237 | 10/1989 | World Int. Prop. O. | C08F 4/60 |
| WO9003414 | 4/1990 | World Int. Prop. O. | C08L 23/08 |

OTHER PUBLICATIONS

K. Swogger; "The Material Properties of Polymers made from Constrained Geometry Catalysts"; pp. 155–165; Sep. 22–24, 1992; *Proceedings of the Second International Business Forum on Specialty Polyolefins*.
G. Schwank; "Selected Applications for Constrained Geometry Catalyst Technology (CGCT) Polymers"; Sep. 23, 1992; *Proceedings of the Second International Business Forum on Specialty Polyolefins*.
"Dow Catalyst Advance is a Threat to Exxon"; p. 5; Dec. 23, 1991; *Chemical Marketing Reporter*.
"Dow Unveils Low-Pressure LDPE System"; pp. 3 and 5; Oct. 24, 1979; *The Journal of Commerce*.
Bernie Miller; "Dow Unveils Constrained Geometry PES"; p. 24; Dec. 1992; *Plastics World*.
"New Technology, New Trade Name"; p. 35; Feb. 1993; *Plastics Engineering*.
H. Tilton; "The Positive Track"; pp. SR3–SR5; Feb. 1993; *Chemical Marketing Reporter*.
"Dow Plastics Announces Commercial Plans for IN-SITE"; Jan. 15, 1993; No. 11; *Dow Today*.

(List continued on next page.)

*Primary Examiner*—Morton Foelak
*Attorney, Agent, or Firm*—J. Robert Dean, Jr.

[57] ABSTRACT

Disclosed is an ethylenic polymer foam structure comprising an ethylenic polymer material. The ethylenic polymer material contains a substantially linear ethylenic polymer having: a) a melt flow ratio, $I_{10}I_2$, $\geq 5.63$; b) a molecular weight distribution, $M_w/M_n$, defined by the equation $M_w/M_n \leq (I_{10}/I_2) - 4.63$; and c) a critical shear rate at onset of surface melt fracture of at least 50 percent greater than the critical shear rate at the onset of surface melt fracture of a linear olefin polymer having about the same $I_2$ and $M_w/M_n$. The foam structures have toughness and elasticity similar to those formed from conventional LLDPE without the poor dimensional stability and foam quality associated with those structures. The foam structures have foam quality similar to those made with conventional LDPE but with enhanced toughness and elasticity. Further disclosed is a process for making the above foam structure and making it in a foam bead form. Further disclosed is a process for making an article of the foam beads.

23 Claims, No Drawings

OTHER PUBLICATIONS

"Meanwhile, Dow may be Leapfrogging Exxpol with Single-site Catalysts of its own"; p. 1; Dec. 23, 1991; vol. 23, No. 25; *Plastics Focus*.

R. Martino; "New Polyolefin Resins Emerge: 'Branched Linear' Copolymers"; p. 11; Jan., 1993; *Modern Plastics*.

"Dow gets Patent on new Olefin Copolymers"; p. 11; Jan., 1993; *Modern Plastics*.

"Novel Rheological Behavior Claimed for New-tech Polyolefins"; pp. 23-25; Nov., 1992; *Plastics Technology*.

"New Polyolefins Excel as Impact Modifiers"; p. 11; Nov., 1992; *Plastics Technology*.

"Dow Plans Three-phase Rollout of Polyolefin 'Plastomers' and Elastomers"; p. 63; Nov., 1992; *Plastics Technology*.

"New Name for Constrained Geometry Catalyst Technology Dow Announces INSITE"; Dec. 16, 1992; *News from Dow Plastics*.

"Dow Plastics Breaking the Rules with INSITE"; Feb. 22, 1993; *News from Dow Plastics*.

G. Knight and S. Lai; "Dow Constrained Geometry Catalyst Technology: New Rules for Ethylene α-Olefin Interpolymers-Unique Structure and Property Relationships"; Feb. 22, 1993; Society of Plastics Engineers RETEC Polyolefins VIII Conference.

K. Swogger, C. Kao; "Process Technology for Unique Polymer Design Using Dow Constrained Geometry Catalyst"; Feb. 22, 1993; Society of Plastics Engineers RETEC Polyolefins VIII Conference.

FOAM STRUCTURES OF ETHYLENIC POLYMER MATERIAL HAVING ENHANCED TOUGHNESS AND ELASTICITY AND PROCESS FOR MAKING

CROSS-REFERENCE TO RELATED APPLICATIONS

This application is a continuation-in-part of U.S. Ser. No. 08/032,917, filed Mar. 18, 1993, now abandoned. Related applications include U.S. Ser. Nos. 07/939,281, filed Sep. 2, 1992 and 07/776,130, filed Oct. 15, 1991.

BACKGROUND OF THE INVENTION

This invention relates to an ethylenic polymer foam structure having enhanced toughness and elasticity and a process for making the foam.

Commercially-available ethylenic polymer foam structures are typically made with conventional highly-branched low density polyethylene (LDPE) resins made by high pressure processes. Foam structures of LDPE resins have been found to be suitable for cushion packaging and other applications.

There exists a need for an ethylenic polymer foam structure having better toughness and elastic characteristics than foam structures of LDPE resins. Such tougher and more elastic foam structures would be very useful in sporting and leisure applications as well as cushion packaging applications.

One means of making a tougher, more elastic ethylenic polymer foam structure is to utilize conventional, heterogeneously-branched linear low density polyethylene (LLDPE) resins as the primary or secondary resin in the foam. Unfortunately, LLDPE resins have undesirable extrusion foaming characteristics.

It would be desirable to have an ethylenic polymer foam having foamability similar to LDPE foams and toughness and elasticity similar to LLDPE foams.

SUMMARY OF THE INVENTION

According to the present invention, there is an ethylenic polymer foam structure comprising an ethylenic polymer material. The ethylenic polymer material comprises a substantially linear ethylenic polymer having: a) a melt flow ratio, $I_{10}/I_2$, $\geq 5.63$; b) a molecular weight distribution, $M_w/M_n$, defined by the equation $M_w/M_n \leq (I_{10}/I_2) - 4.63$; and c) a critical shear rate at onset of surface melt fracture of at least 50 percent greater than the critical shear rate at the onset of surface melt fracture of a linear olefin polymer having about the same $I_2$ and $M_w/M_n$.

Further according to the present invention, there is a process for making an ethylenic polymer foam structure. The process comprises: a) heating the ethylene polymer material described above to form a melt polymer material; b) incorporating into the melt polymer material at an elevated pressure a blowing agent; and c) expanding the foamable gel at a reduced pressure to form the foam structure.

Further according to the present invention, there is a process for making ethylenic polymer foam structure in the form of a foam bead. The process comprises: a) forming a suspension of discrete particles of the ethylenic polymer material described above in a liquid in which it is substantially insoluble and at an elevated temperature and pressure; b) impregnating a blowing agent into the discrete particles at an elevated temperature and pressure; and c) discharging the discrete particles into an atmosphere or reduced pressure to form the foam beads.

Further according to the present invention, there is a process for making an article of foam beads of an ethylenic polymer foam structure by a suitable molding method. One method involves: a) pneumatically compressing the foam beads; b) charging the foam beads into a mold; and c) heating the beads with steam or hot air above the softening point of the polymer to let the beads expand and weld.

Another method involves: a) charging the foam beads into a mold; b) heating the foam beads above the softening point of the polymer; and c) mechanically compressing the beads to weld. See U.S. Pat. No. 3,504,068, which is incorporated herein by reference.

Yet another method involves: a) impregnating the foam beads with air at an elevated pressure, preferably at an elevated temperature below the softening point of the polymer; b) charging the foam beads into a mold; and c) heating the beads above its softening point to expand and weld. See U.S. Pat. No. 3,953,558, which is incorporated herein by reference.

DETAILED DESCRIPTION

Elastic, substantially linear ethylenic polymers have unusual properties, including an unusual combination of properties, which leads to enhanced processability of the novel polymers. The substantially linear ethylenic polymers have processability similar to highly branched low density polyethylene, but the strength in toughness of linear low density polyethylene.

The substantially linear ethylenic polymers preferably have a critical shear rate at onset of surface melt fracture of at least 50 percent greater than the critical shear rate at the onset of surface melt fracture of a linear ethylenic polymer having about the same $I_2$ and $M_w/M_n$.

The elastic substantially linear ethylenic polymers also have a processing index (PI) less than or equal to about 70 percent of the PI of a comparative linear ethylenic polymer at about the same $I_2$ and $M_w/M_n$.

The elastic substantially linear ethylenic polymers also preferably have a melt flow ratio, $I_{10}/I_2$, $\geq 5.63$, and preferably a molecular weight distribution, $M_w/M_n$, defined by the equation: $M_w/M_n \leq (I_{10}/I_2) - 4.63$.

Elastic substantially linear ethylenic polymers comprising ethylene homopolymers or a copolymer of ethylene with at least one $C_3$–$C_{20}$ α-olefinic (alpha-olefinic) comonomer are especially preferred.

Other properties of the substantially linear polymers include: a) a density preferably from about 0.85 grams/cubic centimeter (g/cm$^3$) to about 0.97 g/cm$^3$; and b) a melt index, $I_2$, preferably from about 0.01 grams/10 minutes to about 1000 gram/10 minutes.

Preferably the melt flow ratio, $I_{10}/I_2$, is from about 7 to about 20.

The molecular weight distribution ($M_w/M_n$) is preferably about 3–5 or less, more preferably from about 1.5 to about 2.5, and most preferably from about 1.7 to about 2.3.

Throughout this disclosure, "melt index" or "$I_2$" is measured in accordance with ASTM D-1238 (190° C./2.16 kg); "$I_{10}$" is measured in accordance with ASTM D-1238 (190° C./10 kg).

The melt tension of these new polymers is also surprisingly good, e.g., as high as about 2 grams or more, especially for polymers which have a very narrow molecular weight distribution (i.e., $M_w/M_n$ from about 1.5 to about 2.5).

The substantially linear polymers can be homopolymers of ethylene (polyethylene) or they can be copolymers of ethylene with at least one $C_3$–$C_{20}$ α-olefinic and/or $C_2$–$C_{20}$ acetylenically compounds and/or $C_4$–$C_{18}$ diolefinics and/or other unsaturated comonomers. Useful comonomers include ethylenically unsaturated monomers, conjugated or nonconjugated dienes, polyenes, etc. Preferred monomers include the $C_3$–$C_{10}$ α-olefinics especially 1-propene, isobutylene, 1-butene, 1-hexene, 4-methyl-1-pentene, and 1-octene. Other useful comonomers include styrene, halo- or alkyl substituted styrenes, tetrafluoroethylene, vinylbenzocyclobutane, 1,4-hexadiene, and naphtenics (e.g., cyclo-pentene, cyclo-hexene and cyclo-octene).

The term "substantially linear polymers" means that the polymer backbone is substituted with about 0.01 long chain branches/1000 carbons to about 3 long chain branches/1000 carbons, more preferably from about 0.01 long chain branches/1000 carbons to about 1 long chain branches/1000 carbons, and especially from about 0.05 long chain branches/1000 carbons to about 1 long chain branches/1000 carbons.

The term "linear ethylenic polymers" means that the ethylenic polymer does not have long chain branching. That is, the linear ethylenic polymer has an absence of long chain branching, as for example the conventional linear low density polyethylene polymers or linear high density polyethylene polymers made using Ziegler polymerization processes (for example, U.S. Pat. Nos. 4,076,698 or 3,645,992, both of which are incorporated herein by reference). The term "linear ethylenic polymers" does not refer to high pressure branched polyethylene, ethylene/vinyl acetate copolymers, or ethylene/vinyl alcohol copolymers which are known to those skilled in the art to have numerous long chain branches.

Long chain branching is defined herein as a chain length of at least about 6 carbons, above which the length cannot be distinguished using $^{13}C$ nuclear magnetic resonance (NMR) spectroscopy. The long chain branch can be as long as about the same length as the length of the polymer back-bone.

Long chain branching is determined by using NMR spectroscopy and is quantified using the method of Randall (*Rev. Macromol. Chem. Phys.*, C29 (2&3), p. 285–297), the disclosure of which is incorporated herein by reference.

Excellent teachings regarding substantially linear ethylenic polymers and processes for making are seen in U.S. Ser. Nos. 07/939,281, filed Sep. 2, 1992 and 07/776,130, filed Oct. 15, 1991, both of which are incorporated herein by reference.

"Melt tension" is measured by a specially designed pulley transducer in conjunction with the melt indexer. Melt tension is the load that the extrudate or filament exerts while passing over the pulley at the standard speed of 30 rpm. The melt tension measurement is similar to the "Melt Tension Tester" made by Toyoseiki and is described by John Dealy in *Rheometers for Molten Plastics*, published by Van Nostrand Reinhold Co. (1982) on page 250–251.

The SCBDI (Short Chain Branch Distribution Index) or CDBI (Composition Distribution Branch Index) is defined as the weight percent of the polymer molecules having a comonomer content within 50 percent of the median total molar comonomer content. The CDBI of a polymer is readily calculated from data obtained from techniques known in the art, such as, for example, temperature rising elution fractionation (abbreviated herein as "TREF") as described, for example, in Wild et al., *Journal of Polymer Science, Poly. Phys. Ed.*, Vol. 20, p. 441 (1982), or in U.S. Pat. No. 4,798,081, both disclosures of which are incorporated herein by reference. The SCBDI or CDBI for the substantially linear ethylenic polymers of the present invention is preferably greater than about 30 percent, especially greater than about 50 percent. Thus, the substantially linear polymers are homogeneously branched.

A unique characteristic of the presently claimed polymers is a highly unexpected flow property where the $I_{10}/I_2$ value is essentially independent of polydispersity index (i.e. $M_w/M_n$). This is contrasted with conventional polyethylene resins having rheological properties such that as the polydispersity index increases, the $I_{10}/I_2$ value also increases.

The density of the ethylene or ethylene/α-olefinic substantially linear ethylenic polymers is measured in accordance with ASTM D-792 and is generally from about 0.85 g/cm$^3$ to about 0.97 g/cm$^3$ and preferably from about 0.87 g/cm$^3$ to about 0.95 g/cm$^3$.

The molecular weight of the ethylene or ethylene/α-olefinic substantially linear ethylenic polymers in the present invention is conveniently indicated using a melt index measurement according to ASTM D-1238, Condition 190° C./2.16 kg (formally known as "Condition (E)" and also known as $I_2$). Melt index is inversely related to the molecular weight of the polymer. Thus, the higher the molecular weight, the lower the melt index, although the relationship is not linear. The melt index for the ethylene or ethylene/α-olefinic substantially linear ethylenic polymers used herein is generally from about 0.01 grams/10 minutes (g/10 min) to about 1000 g/10 min, preferably from about 0.05 g/10 min to about 100 g/10 min, and especially from about 0.1 g/10 min to about 20 g/10 min.

Additives such as antioxidants (e.g., hindered phenolics (e.g., Irganox® 1010), phosphites (e.g., Irgafos® 168)), pigments, and the like can also be included in the polyethylene compositions, to the extent that they do not interfere with the enhanced properties discovered by applicants.

Ethylenic polymer materials of blends of the substantially linear ethylenic polymer and a suitable different ethylenic polymer or other natural or synthetic polymers are possible. Suitable different ethylenic polymers include low (LDPE), medium (MDPE), and high density polyethylenes (HDPE) (for example, those made using Ziegler catalysts as in U.S. Pat. No. 4,076,698), ethylene/ester copolymers, ethylene/vinyl acetate copolymers, copolymers of ethylene and ethylenically unsaturated carboxylic acid, homo and copolymers of alpha-ethylenics, etc. Other suitable polymers include polystyrene (including high impact polystyrene, styrene-butadiene block copolymers, polyisoprene, and other rubbers. Blends comprising a major proportion of the resin having the higher melting point are preferred. Regardless of composition, the ethylenic polymer material preferably comprises greater than 50 and more preferably greater than 70 weight percent of ethylenic monomeric units. The ethylenic polymer material may be comprised completely or entirely of ethylenic monomeric units. Preferred blends are those with the substantially linear ethylenic polymer and other conventional ethylenic polymers such as LDPE, HDPE, ethylene/acrylic acid copolymer (EAA), and LLDPE.

The improved melt elasticity and processibility of the substantially linear polymers according to the present invention result, it is believed, from their method of production. The polymers may be produced via a continuous (as opposed to a batch) controlled polymerization process using at least one reactor, but can also be produced using multiple reactors (e.g., using a multiple reactor configuration as described in U.S. Pat. No. 3,914,342) at a polymerization temperature and pressure sufficient to produce the polymers having the desired properties. According to one embodiment of the present process, the polymers are produced in a continuous process, as opposed to a batch process. Preferably, the polymerization temperature is from about 20° C. to about 250° C., using constrained geometry catalyst technology. If a narrow molecular weight distribution polymer ($M_w/M_n$ of from about 1.5 to about 2.5) having a higher $I_{10}/I_2$ ratio (e.g. $I_{10}/I_2$ of about 7 or more, preferably about 8 or more, more preferably about 9 or more) is desired, the ethylene concentration in the reactor is preferably not more than about 8 percent by weight of the reactor contents, especially not more than about 4 percent by weight of the reactor contents. Preferably, the polymerization is performed in a solution polymerization process. Generally, manipulation of $I_{10}/I_2$ while holding $M_w/M_n$ relatively low for producing the novel polymers described herein is a function of reactor temperature and/or ethylene concentration. Reduced ethylene concentration and higher temperature generally produces higher $I_{10}/I_2$.

The molecular weight distribution ($M_w/M_n$) of the individual polymer samples is analyzed by gel permeation chromatography (GPC) on a Waters 150° C. high temperature chromatographic unit equipped with three mixed porosity columns (Polymer Laboratories $10^8$, $10^4$, $10^5$, and $10^6$), operating at a system temperature of 140° C.. The solvent is 1,2,4-trichlorobenzene, from which 0.3 percent by weight solutions of the samples are prepared for injection. The flow rate is 1.0 milliliters/minute and the injection size is 200 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Word in *Journal of Polymer Science, Polymer Letters*, Vol. 6, (621) 1968, incorporated herein by reference) to derive the following equation: $M_{polyethylene} = a*(M_{polystyrene})^b$. In this equation, $a = 0.4316$ and $b = 1.0$. Weight average molecular weight, $M_w$, is calculated in the usual manner according to the following formula: $M_w = \Sigma w_i * M_i$, where $w_i$ and $M_i$ are the weight fraction and molecular weight, respectively, of the ith fraction eluting from the GPC column.

The rheological processing index (PI) is measured by a gas extrusion rheometer (GER). The GER is described by M. Shida, R. N. Shroff and L. V. Cancio in *Polym. Eng. Sci.*, Vol. 17, no. 11, p. 770 (1977), and in *Rheometers for Molten Plastics* by John Dealy published by Van Nostrand Reinhold Co. (1982) on page 97–99, the disclosures of both of which are incorporated herein by reference. The processing index is measured at a temperature of 190° C., at nitrogen pressure of 2500 psig using 0.0296 inch diameter, 20:1L/D die having an entrance angle of 180° C. The GER processing index is calculated in millipoise units from the following equation:

$$PI = 2.15 \times 10^6 \text{ dynes/cm}^2/(1000 \times \text{shear rate}),$$

wherein:
  $2.15 \times 10^6$ dynes/cm$^2$ is the shear stress at 2500 psi, and the shear rate is the shear rate at the wall as represented by the following equation:

$$32 Q'/(60 \text{ sec/min})(0.745)(\text{Diameter} \times 2.54 \text{ cm/in})^3,$$

wherein:
  $Q'$ is the extrusion rate (gms/min),
  0.745 is the melt density of polyethylene (gm/cm$^3$), and
  Diameter is the orifice diameter of the capillary (inches).

The PI is the apparent viscosity of a material measured at apparent shear stress of $2.15 \times 10^6$ dyne/cm$^2$.

For the substantially linear ethylenic polymers disclosed herein, the PI is less than or equal to 70 percent of that of a comparative linear ethylenic polymer at about the same $I_2$ and $M_w/M_n$.

Suitable constrained geometry catalysts for use herein preferably include constrained geometry catalysts as disclosed in U.S. Ser. Nos.: 545,403, filed Jul. 3, 1990; 758,654, filed Sep. 12, 1991; 758,660, filed Sep. 12, 1991; and 720,041, filed Jun. 24, 1991, the teachings of all of which are incorporated herein by reference. The monocyclopentadienyl transition metal ethylenic polymerization catalysts taught in U.S. Pat. No. 5,026,798, the teachings of which are incorporated herein by reference, are also suitable for use in preparing the polymers of the present invention.

Constrained-geometry catalysts useful in making the substantially linear ethylenic polymer comprise a metal complex and a cocatalyst.

Metal complexes correspond to the Formula (I):

wherein:
  M is selected from the group consisting of groups 3–10 or the Lanthanide series of the Periodic Table of the Elements;
  Cp* is selected from the group consisting of indenyl, tetrahydroindenyl, fluorenyl, octahydrofluorenyl, tetrahydrofluorenyl, cyclopentadienyl, and R-substituted cyclopentadienyl bound in an $\eta^5$ bonding mode to M;
  X is, independently each occurrence, an anionic ligand group selected from the group consisting of hydride, halide, alkyl of up to 30 carbon atoms, alkoxy having up to a total of 30 carbon and oxygen atoms, cyanide, azide, acetylacetonate, aryl of up to 30 carbon atoms, aryloxy having up to a total of 30 carbon and oxygen atoms, norbornyl, and benzyl;
  n is 0, 1, 2, 3, or 4 and is 2 less than the valence of M;
  Y is NR″, PR″, O, or S;
  Z is $CR_2*$, $CR_2*CR_2*$, $SiR_2*$, $SiR_2*SiR_2*$;
  R is selected from the group consisting of alkyl having 1 to 20 carbon atoms, cyano, norbornyl, benzyl, aryl of up to 20 carbon atoms, $(R')_8Si$, and $(R')_3Ge$;

R' is selected from the group consisting of $C_1$-$C_{20}$ alkyl and aryl of up to 20 carbon atoms;

R" is selected from the group consisting of $C_1$-$C_{20}$ alkyl, aryl of up to 20 carbon atoms, benzyl, haloaryl having up to a total of 20 carbon and halogen atoms, 2-methoxyphenyl, 4-methoxyphenyl, and norbornyl; and R* is selected from the group consisting of hydrogen, $C_1$-$C_{20}$ alkyl, haloalkyl having up to a total of 20 carbon and halogen atoms, aryl of up to 20 carbon atoms, and haloaryl having up to a total of 20 carbon and halogen atoms.

Preferred metal complexes are those of Formula (I) wherein:

M is titanium, zirconium, or hafnium;

X is, independently each occurrence, selected from the group consisting of halide, alkyl of up to 30 carbon atoms, aryl of up to 30 carbon atoms, and benzyl;

n is 1 or 2;

Y is NR";

Z is $CR_2{}^*CR_2{}^*$ or $SiR_2{}^*$;

R is selected from the group consisting of alkyl having 1 to 20 carbon atoms, benzyl, aryl of up to 20 carbon atoms, and $(R')_3Si$;

R' is selected from the group consisting of $C_1$-$C_{20}$ alkyl and aryl of up to 20 carbon atoms;

R" is selected from the group consisting of $C_1$-$C_{20}$ alkyl, aryl of up to 20 carbon atoms, and benzyl; and R* is selected from the group consisting of hydrogen, $C_1$-$C_{20}$ alkyl, and aryl of up to 20 carbon atoms.

It should be noted that the complex may exist as a dimer or higher oligomer. Further preferably, at least one of R, Z, or R" is an electron donating moiety. Thus, highly preferably Y is a nitrogen or phosphorus containing group corresponding to the formula —NR"— or —PR"— wherein R" is $C_1$-$C_{20}$ alkyl, i.e., an alkyl amido or alkyl phosphido group.

Most highly preferred complex compounds are amidosilane- or amidoalkanediyl- compounds corresponding to Formula (II):

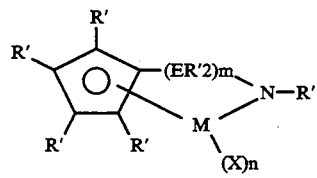

wherein:

M is titanium, zirconium or hafnium, bound in an $\eta^5$ bonding mode to the cyclopentadienyl group;

R' each occurrence is independently selected from the group consisting of hydrogen, silyl, alkyl, aryl and combinations thereof, said R' having up to 10 carbon or silicon atoms;

E is silicon or carbon;

X independently each occurrence is hydride, halo, alkyl, aryl, aryloxy or alkoxy, said X having up to 10 carbons;

m is 1 or 2; and n is 1 or 2.

Examples of the above most highly preferred metal coordination compounds include compounds wherein the R' on the amido group is methyl, ethyl, propyl, butyl, pentyl, hexyl, (including isomers), norbornyl, benzyl, or phenyl; the cyclopentadienyl group is cyclopentadienyl, indenyl, tetrahydroindenyl, fluorenyl, or octahydrofluorenyl; R' on the foregoing cyclopentadienyl groups each occurrence is hydrogen, methyl, ethyl, propyl, butyl, pentyl, hexyl, (including isomers), norbornyl, benzyl, or phenyl; and X is chloro, bromo, iodo, methyl, ethyl, propyl, butyl, pentyl, hexyl, (including isomers), norbornyl, benzyl, or phenyl.

Specific compounds include: (tertbutylamido)(tetramethyl-$\eta^5$-cyclopentadienyl)-1,2ethanediylzirconium dichloride, (tertbutylamido)(tetramethyl-$\eta^5$-cyclopentadienyl)-1,2-ethanediyltitanium dichloride, (methylamido)(tetramethyl-$\eta^5$-cyclopentadienyl)-1,2-ethanediyl zirconium dichloride, (methylamido)(tetramethyl-$\eta^5$-cyclopentadienyl)-1,2-ethanediyltitanium dichloride, (ethylamido)(tetramethyl-$\eta^5$-cyclopentadienyl)-methylenetitanium dichloro, (tertbutylamido)dibenzyl(tetramethyl-$\eta^5$-cyclopentadienyl) silanezirconium dibenzyl, (benzylamido)dimethyl-(tetramethyl-$\eta^5$-cyclopentadienyl)silanetitanium dichloride, (phenylphosphido)dimethyl(tetramethyl-$\eta^5$-cyclopentadienyl)silanezirconium dibenzyl, (tertbutylamido)dimethyl(tetramethyl-$\eta^5$-cyclopentadienyl)silanetitanium dimethyl, and the like.

The complexes may be prepared by contacting a derivative of a metal, M, and a group I metal derivative or Grignard derivative of the cyclopentadienyl compound in a solvent and separating the salt byproduct. Suitable solvents for use in preparing the metal complexes are aliphatic or aromatic liquids such as cyclohexane, methylcyclohexane, pentane, hexane, heptane, tetrahydrofuran, diethyl ether, benzene, toluene, xylene, ethylbenzene, etc., or mixtures thereof.

In a preferred embodiment, the metal compound is $MX_{n+1}$, i.e., M is in a lower oxidation state than in the corresponding compound, $MX_{n+2}$ and the oxidation state of M in the desired final complex. A noninterfering oxidizing agent may thereafter be employed to raise the oxidation state of the metal. The oxidation is accomplished merely by contacting the reactants utilizing solvents and reaction conditions use in the preparation of the complex itself. By the term "noninterfering oxidizing agent" is meant a compound having an oxidation potential sufficient to raise the metal oxidation state without interfering with the desired complex formation or subsequent polymerization processes. A particularly suitable noninterfering oxidizing agent is AgCl or an organic halide such as methylene chloride. The foregoing techniques are disclosed in U.S. Ser. Nos. 545,403, filed Jul. 3, 1990 and 702,475, filed May 20, 1991, the teachings of both of which are incorporated herein by reference.

Additionally the complexes may be prepared according to the teachings of the copending U.S. Ser. No. 778,433 entitled: "Preparation of Metal Coordination Complex (I)", filed in the names of Peter Nickias and David Wilson, on Oct. 15, 1991 and the copending U.S. Ser. No. 778,432 entitled: "Preparation of Metal Coordination Complex (II)", filed in the names of Peter Nickias and David Devore, on Oct. 15, 1991, the teachings of which are incorporated herein by reference thereto.

Suitable cocatalysts for use herein include polymeric or oligomeric aluminoxanes, especially methyl aluminoxane, as well as inert, compatible, noncoordinating, ion forming compounds. So-called modified methyl aluminoxane (MMAO) is also suitable for use as a cocatalyst. One technique for preparing such modified aluminoxane is disclosed in U.S. Pat. No. 5,041,584, the teachings of which are incorporated herein by reference. Aluminoxanes can also be made as disclosed in U.S. Pat. Nos. 5,542,199, 4,544,762, 5,015,749, and 5,041,585, the entire specification of each of which is incorporated herein by reference. Preferred cocatalysts are inert, noncoordinating, boron compounds.

Ionic active catalyst species which can be used to polymerize the polymers described herein correspond to Formula (III):
wherein:
M, Cp*, X, Y, and Z are as defined for Formula (I) above;

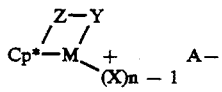

n is 1, 2, 3, or 4 and is 2 less than the oxidation state of M; and

A− is a noncoordinating, compatible anion.

As used herein, the recitation "noncoordinating, compatible anion" means an anion which either does not coordinate to the monocyclopentadienyl or substituted monocyclopentadienyl group containing cation or which is only weakly coordinated to said cation thereby remaining sufficiently labile to be displaced by a neutral Lewis base. A noncoordinating, compatible anion specifically refers to a compatible anion which when functioning as a charge balancing anion in the catalyst system of this invention does not transfer an anionic substituent or fragment thereof to said cation thereby forming a neutral four coordinate metallocene and a neutral metal byproduct. "Compatible anions" are anions which are not degraded to neutrality when the initially formed complex decomposes and are noninterfering with desired subsequent polymerization or other uses of the complex.

One method of making the ionic catalyst species which can be utilized to make the polymers of the present invention involve combining: a) at least one first component which is a mono(cyclopentadienyl) derivative of a metal of Group 3–10 or the Lanthanide Series of the Periodic Table of the Elements containing at least one substituent which will combine with the cation of a second component (described hereinafter) which first component is capable of forming a cation formally having a coordination number that is one less than its valence; and b) at least one second component which is a salt of a Bronsted acid and a noncoordinating, compatible anion.

More particularly, the non-coordinating, compatible anion of the Bronsted acid salt may comprise a single coordination complex comprising a charge-bearing metal or metalloid core, which anion is both bulky and non-nucleophilic. The recitation "metalloid", as used herein, includes non-metals such as boron, phosphorus and the like which exhibit semi-metallic characteristics.

Illustrative, but not limiting examples of monocyclopentadienyl metal components (first components) which may be used in the preparation of cationic complexes are derivatives of titanium, zirconium, vanadium, hafnium, chromium, lanthanum, etc. Preferred components are titanium or zirconium compounds. Examples of suitable monocyclopentadienyl metal compounds are hydrocarbyl-substituted monocyclopentadienyl metal compounds such as (tert-butylamido)(tetramethyl-$\eta^5$-cyclopentadienyl)-1,2-ethanediylzirconium dimethyl, (tert-butylamido)(tetramethyl-$\eta^5$-cyclopentadienyl)-1,2-ethanediyltitanium dimethyl, (methylamido)(tetramethyl-$\eta^5$-cyclopentadienyl)-1,2-ethanediylzirconium dibenzyl, (methylamido)(tetramethyl-$\eta^5$-cyclopentadienyl)-1,2-ethanediyltitanium dimethyl, (ethylamido)(tetramethyl-$\eta^5$-cyclopentadienyl)methylenetitanium dimethyl, (tertbutylamido)dibenzyl(tetramethyl-$\eta^5$-cyclopentadienyl) silanezirconium dibenzyl, (benzylamido)dimethyl- (tetramethyl-$\eta^5$ -cyclopentadienyl)silanetitanium diphenyl, (phenylphosphido)dimethyl(tetramethyl-$\eta^5$-cyclopentadienyl)silanezirconium dibenzyl, and the like.

Such components are readily prepared by combining the corresponding metal chloride with a dilithium salt of the substituted cyclopentadienyl group such as a cyclopentadienyl-alkanediyl, cyclopentadienyl—silane amide, or cyclopentadienyl—phosphide compound. The reaction is conducted in an inert liquid such as tetrahydrofuran, $C_{5-10}$ alkanes, toluene, etc. utilizing conventional synthetic procedures. Additionally, the first components may be prepared by reaction of a group II derivative of the cyclopentadienyl compound in a solvent and separating the salt by-product. Magnesium derivatives of the cyclopentadienyl compounds are preferred. The reaction may be conducted in an inert solvent such as cyclohexane, pentane, tetrahydrofuran, diethyl ether, benzene, toluene, or mixtures of the like. The resulting metal cyclopentadienyl halide complexes may be alkylated using a variety of techniques. Generally, the metal cyclopentadienyl alkyl or aryl complexes may be prepared by alkylation of the metal cyclopentadienyl halide complexes with alkyl or aryl derivatives of group I or group II metals. Preferred alkylating agents are alkyl lithium and Grignard derivatives using conventional synthetic techniques. The reaction may be conducted in an inert solvent such as cyclohexane, pentane, tetrahydrofuran, diethyl ether, benzene, toluene, or mixtures of the like. A preferred solvent is a mixture of toluene and tetrahydrofuran.

Compounds useful as a second component in the preparation of the ionic catalysts useful in this invention will comprise a cation, which is a Bronsted acid capable of donating a proton, and a compatible noncoordinating anion. Preferred anions are those containing a single coordination complex comprising a charge-bearing metal or metalloid core which anion is relatively large (bulky), capable of stabilizing the active catalyst species (the Group 3–10 or Lanthanide Series cation) which is formed when the two components are combined and sufficiently labile to be displaced by ethylenicic, diethylenicic and acetylenically unsaturated substrates or other neutral Lewis bases such as ethers, nitriles and the like. Suitable metals, then, include, but are not limited to, aluminum, gold, platinum and the like. Suitable metalloids include, but are not limited to, boron, phosphorus, silicon and the like. Compounds containing anions which comprise coordination complexes containing a single metal or metalloid atom are, of course, well known and many, particularly such compounds containing a single boron atom in the anion portion, are available commercially. In light of this, salts containing anions comprising a coordination complex containing a single boron atom are preferred.

Highly preferably, the second component useful in the preparation of the catalysts of this invention may be represented by the following general formula:

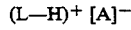

wherein:
  L is a neutral Lewis base;
  (L—H)+ is a Bronsted acid; and
  [A]− is a compatible, noncoordinating anion.
More preferably [A]− corresponds to the formula:

$$[M'Q_q]^-$$

wherein:
  M' is a metal or metalloid selected from Groups 5–15 of the Periodic Table of the Elements;
  Q independently each occurrence is selected from the Group consisting of hydride, dialkylamido, halide, alkoxide, aryloxide, hydrocarbyl, and substituted-hydrocarbyl radicals of up to 20 carbons with the proviso that in not more than one occurrence is Q halide; and
  q is one more than the valence of M'.

Second components comprising boron which are particularly useful in the preparation of catalysts of this invention may be represented by the following general formula:

$$[L-H]^+ [BQ_4]^-$$

wherein:
  L is a neutral Lewis base;
  [L—H]+ is a Bronsted acid;
  B is boron in a valence state of 3; and
  Q is as previously defined.

Illustrative, but not limiting, examples of boron compounds which may be used as a second component in the preparation of the improved catalysts of this invention are trialkyl-substituted ammonium salts such as triethylammonium tetraphenylborate, tripropyammonium tetraphenylborate, tris(n-butyl)ammonium tetraphenylborate, trimethylammonium tetrakis(p-tolyl)borate, tributylammonium tetrakis(pentafluorophenyl)borate, tripropylammonium tetrakis(2,4-dimethylphenyl)borate, tributylammonium tetrakis(3,5-dimethyphenyl)borate, triethylammonium tetrakis(3,5-di-trifluoromethylphenyl)borate and the like. Also suitable are N,N-dialkyl anilinium salts such as N,N-dimethylaniliniumtetraphenylborate, N,N-diethylanilinium tetraphenylborate, N,N-dimethyl-2,4,6-trimethylanilinium tetraphenylborate and the like; dialkylammonium salts such as di-(i-propyl)ammonium tetrakis(pentafluorophenyl)borate, dicyclohexylammonium tetraphenylborate and the like; and triaryl phosphonium salts such as triphenylphosphonium tetraphenylborate, tri(ethylphenyl)phosphonium tetrakispentafluorophenylborate, tri(dimethylphenyl)phosphonium tetraphenylborate and the like.

Preferred ionic catalysts formed in this manner are those having a limiting charge separated structure corresponding to Formula (IV):

  (IV)

wherein:
  M is a titanium, zirconium, or hafnium;
  Cp*, X and Z are as defined for Formula (I);
  n is 1, 2, 3, or 4 and is 2 less than the oxidation state of M; and
  XA*— is —XB(C$_6$F$_5$)$_3$.

This class of cationic complexes may be conveniently prepared by contacting a metal compound corresponding to Formula (V):
wherein:
  Cp*, M, and n are as previously defined for Formula (IV), with tris(pentafluorophenyl)borane

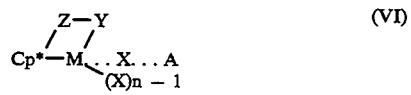  (V)

cocatalyst under conditions to cause abstraction of X and formation of the anion —XB(C$_6$F$_5$)$_3$.

Preferably X in the foregoing ionic catalyst is C$_1$–C$_{10}$ hydrocarbyl, most preferably methyl.

Formula (V) is referred to as the limiting, charge separated structure. However, it is to be understood that, particularly in solid form, the catalyst may not be fully charge separated. That is, the X group may retain a partial covalent bond to the metal atom, M. Thus, the catalysts may be alternately depicted as possessing Formula (VI):

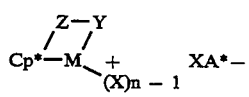  (VI)

The catalysts are preferably prepared by contacting the derivative of a Group 4 or Lanthanide metal with the tris(pentafluorophenyl)borane in an inert diluent such as an organic liquid. Tris(pentafluorophenyl)borane is a commonly available Lewis acid that may be readily prepared according to known techniques. The compound is disclosed in Marks, et al. *J. Am. Chem. Soc.* 1991, 113, 3623–3625 for use in alkyl abstraction of zirconocenes.

All reference to the Periodic Table of the Elements herein shall refer to the Periodic Table of the Elements, published and copyrighted by CRC Press, Inc., 1989. Also, any reference to a Group or Groups shall be to the Group or Groups as reflected in this Periodic Table of the Elements using the IUPAC system for numbering groups.

Other compounds which are useful in the catalyst compositions of this invention, especially compounds containing other Group 4 or Lanthanide metals, will, of course, be apparent to those skilled in the art.

The polymerization conditions for manufacturing the polymers of the present invention are generally those useful in the solution polymerization process, although the application of the present invention is not limited thereto. Slurry and gas phase polymerization processes are also believed to be useful, provided the proper catalysts and polymerization conditions are employed.

Multiple reactor polymerization processes are also useful in the present invention, such as those disclosed in U.S. Pat. No. 3,914,342, incorporated herein by reference. The multiple reactors can be operated in series or in parallel, with at least one constrained geometry catalyst employed in at least one of the reactors.

In general, the continuous polymerization according to the present invention may be accomplished at conditions well known in the prior art for Ziegler-Natta or Kaminsky-Sinn type polymerization reactions, that is, temperatures from 0° C. to 250° C. and pressures from atmospheric to 1000 atmospheres (100 MPa). Suspension, solution, slurry, gas phase or other process conditions may be employed if desired. A support may be employed but preferably the catalysts are used in a homogeneous (i.e., soluble manner. It will, of course, be appreciated that the active catalyst system, form in situ if the catalyst and the cocatalyst components thereof are added directly to the polymerization process and a suitable solvent or diluent, including condensed monomer, is used in said polymerization process. It is, however, preferred to form the active catalyst in a separate step in a suitable solvent prior to adding the same to the polymerization mixture.

Excellent teachings to processes for making ethylenic polymer foam structures and processing them are seen in C. P. Park, "Polyolefin Foam", Chapter 9, *Handbook of Polymer Foams and Technology*, edited by D. Klempner and K. C. Frisch, Hanser Publishers, Munich, Vienna, New York, Barcelona (1991), which is incorporated herein by reference.

The present foam structure may be made by a conventional extrusion foaming process. The structure is generally prepared by heating an ethylenic polymer material to form a plasticized or melt polymer material, incorporating therein a blowing agent to form a foamable gel, and extruding the gel through a die to form the foam product. Prior to mixing with the blowing agent, the polymer material is heated to a temperature at or above its glass transition temperature or melting point. The blowing agent may be incorporated or mixed into the melt polymer material by any means known in the art such as with an extruder, mixer, blender, or the like. The blowing agent is mixed with the melt polymer material at an elevated pressure sufficient to prevent substantial expansion of the melt polymer material and to generally disperse the blowing agent homogeneously therein. Optionally, a nucleator may be blended in the polymer melt or dry blended with the polymer material prior to plasticizing or melting. The foamable gel is typically cooled to a lower temperature to optimize physical characteristics of the foam structure. The gel is then extruded or conveyed through a die of desired shape to a zone of reduced or lower pressure to form the foam structure. The zone of lower pressure is at a pressure lower than that in which the foamable gel is maintained prior to extrusion through the die. The lower pressure may be superatmospheric or subatmospheric (vacuum), but is preferably at an atmospheric level.

The present foam structure may be formed in a coalesced strand form by extrusion of the ethylenic polymer material through a multi-orifice die. The orifices are arranged so that contact between adjacent streams of the molten extrudate occurs during the foaming process and the contacting surfaces adhere to one another with sufficient adhesion to result in a unitary foam structure. The streams of molten extrudate exiting the die take the form of strands or profiles, which desirably foam, coalesce, and adhere to one another to form a unitary structure. Desirably, the coalesced individual strands or profiles should remain adhered in a unitary structure to prevent strand delamination under stresses encountered in preparing, shaping, and using the foam. Apparatuses and method for producing foam structures in coalesced strand form are seen in U.S. Pat. Nos. 3,573,152 and 4,824,720, both of which are incorporated herein by reference.

The present foam structure may also be formed by an accumulating extrusion process as seen in U.S. Pat. No. 4,323,528, which is incorporated by reference herein. In this process, low density foam structures having large lateral cross-sectional areas are prepared by: 1) forming under pressure a gel of the ethylenic polymer material and a blowing agent at a temperature at which the viscosity of the gel is sufficient to retain the blowing agent when the gel is allowed to expand; 2) extruding the gel into a holding zone maintained at a temperature and pressure which does not allow the gel to foam, the holding zone having an outlet die defining an orifice opening into a zone of lower pressure at which the gel foams, and an openable gate closing the die orifice; 3) periodically opening the gate; 4) substantially concurrently applying mechanical pressure by a movable ram on the gel to eject it from the holding zone through the die orifice into the zone of lower pressure, at a rate greater than that at which substantial foaming in the die orifice occurs and less than that at which substantial irregularities in cross-sectional area or shape occurs; and 5) permitting the ejected gel to expand unrestrained in at least one dimension to produce the foam structure.

The present foam structure may also be formed into non-crosslinked foam beads suitable for molding into articles. To make the foam beads, discrete resin particles such as granulated resin pellets are: suspended in a liquid medium in which they are substantially insoluble such as water; impregnated with a blowing agent by introducing the blowing agent into the liquid medium at an elevated pressure and temperature in an autoclave or other pressure vessel; and rapidly discharged into the atmosphere or a region of reduced pressure to expand to form the foam beads. This process is well taught in U.S. Pat. Nos. 4,379,859 and 4,464,484, which are incorporated herein by reference.

In a derivative of the above process, styrene monomer may be impregnated into the suspended pellets prior to impregnation with blowing agent to form a graft interpolymer with the ethylenic polymer material. The polyethylene/polystyrene interpolymer beads are cooled and discharged from the vessel substantially unexpanded. The beads are then expanded and molded by the conventional expanded polystyrene bead molding process. The process of making the polyethylene/polystyrene interpolymer beads is described in U.S. Pat. No. 4,168,353, which is incorporated herein by reference.

The foam beads may then be molded by any means known in the art, such as charging the foam beads to the mold, compressing the mold to compress the beads, and heating the beads such as with steam to effect coalescing and welding of the beads to form the article. Optionally, the beads may be impregnated with air or other blowing agent at an elevated pressure and temperature prior to charging to the mold. Further, the beads may be heated prior to charging. The foam beads may then be molded to blocks or shaped articles by a suitable molding method known in the art. (Some of the methods are taught in U.S. Pat. Nos. 3,504,068 and 3,953,558.) Excellent teachings of the above processes and molding methods are seen in C. P. Park, supra, p. 191, pp. 197–198, and pp. 227–229, which are incorporated herein by reference.

Blowing agents useful in making the present foam structure include inorganic agents, organic blowing agents and chemical blowing agents. Suitable inorganic blowing agents include carbon dioxide, nitrogen, argon, water, air, nitrogen, and helium. Organic blowing agents include aliphatic hydrocarbons having 1–6 carbon atoms, aliphatic alcohols having 1–3 carbon atoms, and fully and partially halogenated aliphatic hydrocarbons having 1–4 carbon atoms. Aliphatic hydrocarbons include methane, ethane, propane, n-butane, isobutane, n-pentane, isopentane, neopentane, and the like. Aliphatic alcohols include methanol, ethanol, n-propanol, and isopropanol. Fully and partially halogenated aliphatic hydrocarbons include fluorocarbons, chlorocarbons, and chlorofluorocarbons. Examples of fluorocarbons include methyl fluoride, perfluoromethane, ethyl fluoride, 1,1-difluoroethane (HFC-152a), 1,1,1-trifluoroethane (HFC-143a), 1,1,1,2-tetrafluoro-ethane (HFC-134a), pentafluoroethane, difluoromethane, perfluoroethane, 2,2-difluoropropane, 1,1,1-trifluoropropane, perfluoropropane, dichloropropane, difluoropropane, perfluorobutane, perfluorocyclobutane. Partially halogenated chlorocarbons and chlorofluorocarbons for use in this invention include methyl chloride, methylene chloride, ethyl chloride, 1,1,1-trichloroethane, 1,1-dichloro-1-fluoroethane (HCFC-141b), 1-chloro-1,1-difluoroethane (HCFC-142b), 1,1-dichloro-2,2,2-trifluoroethane (HCFC-123) and 1-chloro-1,2,2,2-tetrafluoroethane (HCFC-124). Fully halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichlorohexafluoropropane. Chemical blowing agents include azodicarbonamide, azodiisobutyro-nitrile, benzenesulfonhydrazide, 4,4-oxybenzene sulfonyl-semicarbazide, p-toluene sulfonyl semi-carbazide, barium azodicarboxylate, N,N'-dimethyl-N,N'-dinitrosoterephthalamide, and trihydrazino triazine. Preferred blowing agents include isobutane, HFC-152a, and mixtures of the foregoing.

The amount of blowing agent incorporated into the polymer melt material to make a foam-forming polymer gel is from about 0.2 to about 5.0, preferably from about 0.5 to about 3.0, and most preferably from about 1.0 to 2.50 gram moles per kilogram of polymer.

Various additives may be incorporated in the present foam structure such as stability control agents, nucleating agents, inorganic fillers, pigments, antioxidants, acid scavengers, ultraviolet absorbers, flame retardants, processing aids, extrusion aids, and the like.

A stability control agent may be added to the present foam to enhance dimensional stability. Preferred agents include amides and esters of $C_{10-24}$ fatty acids. Such agents are seen in U.S. Pat. Nos. 3,644,230 and 4,214,054, which are incorporated herein by reference. Most preferred agents include stearyl stearamide, glycerol monostearate, glycerol monobehenate, and sorbitol monostearate. Typically, such stability control agents are employed in an amount ranging from about 0.1 to about 10 parts per hundred parts of the polymer.

The present foam structure exhibits excellent dimensional stability. Preferred foams recover 80 or more percent of initial volume within a month with initial volume being measured within 30 seconds after foam expansion. Volume is measured by a suitable method such as cubic displacement of water.

In addition, a nucleating agent may be added in order to control the size of foam cells. Preferred nucleating agents include inorganic substances such as calcium carbonate, talc, clay, titanium oxide, silica, barium sulfate, diatomaceous earth, mixtures of citric acid and sodium bicarbonate, and the like. The amount of nucleating agent employed may range from about 0.01 to about 5 parts by weight per hundred parts by weight of a polymer resin.

The present foam structure is substantially noncrosslinked or uncross-linked. The alkenyl aromatic polymer material comprising the foam structure is substantially free of cross-linking. The foam structure contains no more than 5 percent gel per ASTM D-2765-84 Method A. A slight degree of cross-linking, which occurs naturally without the use of cross-linking agents or radiation, is permissible.

The present foam structure has density of less than 250, more preferably less than 100 and most preferably from about 10 to about 70 kilograms per cubic meter. The foam has an average cell size of from about 0.05 to about 5.0, more preferably from about 0.2 to about 2.0, and most preferably 0.3 to about 1.8 millimeters according to ASTM D3576.

The present foam structure may take any physical configuration known in the art, such as extruded sheet, rod, plank, and profiles. The foam structure may also be formed by molding of expandable beads into any of the foregoing configurations or any other configuration.

The present foam structure may be closed-celled or open-celled. Preferably, the present foam contains 80 percent or more closed cells according to ASTM D2856-A.

The following are examples of the present invention, and are not to be construed as limiting. Unless otherwise indicated, all percentages, parts, or proportions are by weight relative to total weight.

EXAMPLES AND COMPARATIVE EXAMPLES

Table A represents physical properties of certain substantially linear low density polyethylene resins (CGCT resins), a conventional LLDPE resin, and a conventional ultra low linear density resin (ULLDPE resin). The CGCT resins were prepared in a continuous polymerization process with a constrained geometry catalyst as set forth in U.S. Serial No. 07/776,130. CGCT resins are indicated by "CG", and the LLDPE and the ULLDPE resins are indicated by "ZN" prefixes in the resin designation. Foams were prepared in the following examples and comparative examples with the CGCT resins and the ULLDPE and LLDPE resins.

TABLE A

| Physical Properties of the CGCT Resins and the LLDPE Resin | | | | | |
|---|---|---|---|---|---|
| Resin Designation | M.I. (dg/min)[1] | $M_w/M_n$ | Density (g/cm$^3$)[2] | $I_{10}/I_2$ | $T_m$ (°C.)[3] | Melt Tension (gm)[4] |
| CG1 | 1.06 | 2.090 | 0.9018 | 7.61 | 95.3 | 1.46 |
| CG2 | 0.87 | 1.884 | 0.9394 | 8.55 | 126.6 | 1.88 |
| CG3 | 0.57 | 1.903 | 0.8730 | 7.22 | 55.5 | 3.17 |
| CG4 | 2.00 | 1.793 | 0.9014 | 6.45 | 95.6 | 0.71 |
| CG5 | 5.17 | 1.900 | 0.8732 | 7.65 | 60.6 | 0.35 |
| CG6 | 0.98 | 2.190 | 0.9016 | 8.80 | 95.3 | 1.90 |
| ZN1[5] | 0.80 | 4.25 | 0.9050 | 8.70 | 121.3 | 1.32 |
| ZN2[6] | 1.00 | — | 0.9350 | — | 128.0 | — |

[1]Melt index of the resin in decigrams per minute determined per ASTM 1238 at Condition E
[2]Density of the resin in grams per cubic centimeter
[3]Melting point of the resin in degrees Celsius determined by DSC (differential scanning calorimetry) (peak of the endotherm while heating at 10° C./min rate)
[4]Melt tension of the resin in grams
[5]ZN1 is a ULLDPE (Attane 4203 of The Dow Chemical Company)
[6]ZN2 is an LLDPE (Dowlex 2038 of The Dow Chemical Company)

EXAMPLE 1 AND COMPARATIVE EXAMPLE 1

Ethylenic polymer foams of the present invention were prepared from resins CG1 and CG2. They were compared for extrusion foamability and physical properties with ethylenic polymer foams prepared with conventional LLDPE resin (ZN1 and ZN2).

content, but exhibited flow instability, which resulted in uneven foam skins.

TABLE B

Foams of CGCT Resins and LLDPE Resins

| Test No. | Resin Used[1] | BA Level[2] | Foam Temp[3] | Foam Size[4] | Foam Dens[5] | Cell Size[6] | Open Cell[7] | Foam Qual[8] |
| --- | --- | --- | --- | --- | --- | --- | --- | --- |
| 1.1 | CG1 | 1.9 | 98 | 0.84 | 41 | 0.74 | 24 | G |
| 1.2 | CG2 | 1.7 | 120 | 0.48 | 38 | 0.34 | 55 | G |
| 1.3* | ZN1 | 1.9 | 115 | 0.14 | 46 | 0.15 | 70 | PC |
| 1.4* | ZN2 | 1.7 | 123 | 0.36 | 32 | 0.15 | 20 | MF |

*Not an example of the present invention
[1]Refer to Table A for the characteristics of the resins
[2]Gram-moles of blowing agent mixed in per kilograms of polymer (mpk)
[3]The optimum melt temperature providing the best foam in degrees Celsius
[4]Cross-sectional area of foam body in square centimeters
[5]Density of one month-old foam body in kilograms per cubic meters
[6]Cell size in millimeters determined per ASTM D3576
[7]Open cell content in percentage determined per ASTM 2856-A
[8]Quality of foam body: G = good; E = excellent; S = satisfactory; P = poor quality foam having tough skins resulting from collapse of the surface cells; PC = partially collapsed foam; MF = irregular foam strand due to melt fracture The equipment used in this example was a 25 millimeter (mm) (1 inch) screw type extruder having additional zones of mixing and cooling at the end of usual sequential zones of feeding, metering, and mixing. An opening for blowing agent is provided on the extruder barrel between the metering and mixing zones. At the end of the cooling zone, a die orifice having an opening of rectangular shape was attached. The height of the opening, hereinafter called the die gap, was adjustable while its width was fixed at 3.68 mm (0.145 inch).

The granular resins were fed into the hopper of the extruder, and extruded at a uniform rate of 1.8 kilograms per hour (kg/hr) (4 pounds per hour (lb/hr)) by adjusting the screw rotating speed. In Test 1.1, where a lower density resin was tested, two parts of stearyl stearamide was added per one hundred parts of polymer to enhance dimensional stability. The stearyl stearamide was Kemamide S-180 of the Witco Corporation. The stearyl stearamide was pre-blended with the resin granules. Temperatures maintained at the extruder zones were 175° C. at the feeding zone, 180° C. at the melting zone, 190° C. at the metering zone, and 210° C. at the mixing zone. HCFC-142b blowing agent was injected into the injection port at a predetermined rate. The temperature of the cooling zone and the die opening were adjusted in each test to obtain the best foam.

As shown in Table B, the CGCT resins provided good quality foams having a relatively large cell size and cross-sectional size. The resins could be foamed at a relatively low temperature for those polymer densities.

The CGCT resin foams exhibited good dimensional stability. The foam of Test 1.1 had a relatively low open cell content (24 percent), and initially shrank to some degree, but recovered to over 90 percent of the initial volume during aging. The foam of Test 1.2 shrank no more than 4 percent during aging.

In contrast, the foams prepared in Tests 1.3 and 1.4 from conventional LLDPE resins were not satisfactory due to smaller cell size and cross-sectional size. The foam in Test 1.3 partially collapsed, and had a high level of open cells (70 percent). The relatively high foaming temperature (115° C.) of the resin affected its foamability. The higher density LLDPE resin in Test 1.4 expanded to a foam having a relatively low open cell content, but exhibited flow instability, which resulted in uneven foam skins.

EXAMPLE 2

An ethylenic polymer foam of the present invention was prepared using resin CG3.

The equipment and experimental procedure employed was substantially the same as in Example 1 except for the stability control agent, extruder zone temperatures, and the blowing agent level. Glycerol monostearate (GMS) was used as the stability control agent at 2 parts per hundred parts resin (pph) level. The temperatures maintained at the extruder zones were 120° C. at the feeding zone, 160° C. at the melting zone, 180° C. at the metering zone, and 195° C. at the mixing zone. HCFC-142b blowing agent was uniformly injected into the injection port at a rate of 2.2 grams-moles per kilograms of the resin (mpk). The melt was cooled to about 66° C. prior to extrusion through the die.

A satisfactory foam of 1.4 cm$^2$ cross-section, 45 kg/m$^3$ density, 1.2 mm cell size, and 49 percent open cell content was achieved. The foam was dimensionally stable, very soft, and resilient.

EXAMPLE 3

An ethylenic polymer foam of the present invention was prepared using resin CG4.

The equipment and experimental procedure was substantially the same as in Example 1 except for the stability control agent, extruder zone temperatures, and the blowing agent level. The temperatures maintained at the extruder zones were 120° C. at the feeding zone, 165° C. at the melting zone, 190° C. at the metering zone, and 195° C. at the mixing zone. Glycerol monostearate (GMS) was used as the stability control agent at 2 pph level. Two types of blowing agents were employed in the tests of this example: HCFC-142b and a 80/20 by mole mixture of HFC-152a and ethanol (EtOH).

Excellent quality foams were produced when the melt was cooled to about 93° C. prior to extrusion through the die. As seen in Table C, both blowing agents expanded the resin to low-density foams having large cross-sections, and low open-cell contents. Dimensional stability of the foams was excellent. Open-cell contents of the foams are comparable to those of foams prepared from a conventional low-density highly-branched polyethylene (LDPE) on the same foam extrusion apparatus.

TABLE C

| | | | Foams of CGCT Resins | | | | |
|---|---|---|---|---|---|---|---|
| Test No. | BA Type[1] | BA Level[2] | Foam Temp[3] | Foam Size[4] | Foam Dens[5] | Cell Size[6] | Open Cell[7] | Foam Qual[8] |
| 3.1 | HCFC-142b | 1.7 | 93 | 1.40 | 25 | 1.16 | 10 | E |
| 3.2 | HFC-152a/ EtOH | 1.7 | 93 | 1.35 | 27 | 0.44 | 7 | E |

[1]Types of blowing agent used. The by-mole mixture ratio of HFC-152a and EtOH was 80/20
[2-8]Same as in Table B

EXAMPLE 4 AND COMPARATIVE EXAMPLE 4

Ethylenic polymer foams according to the present invention were prepared with a blend of a CGCT resin and a conventional, highly-branched low density polyethylene (LDPE) resin. That foam was compared with a foam prepared with a blend of a conventional LLDPE resin (ZN1) and the LDPE resin.

Resins CG1 and ZN1 were each blended with the LDPE resin in a 50/50 weight ratio. The LDPE resin was of the type prepared by a high pressure process, and has a melt index of 1.8 and a density of 0.923 g/cc. Two pph stearyl stearamide was added for foam stability.

The equipment and operating procedure were substantially the same as in Example 1. HCFC-142b was employed as the blowing agent at 1.5 mpk level. In Test 4.1, a small amount of talc (0.05 pph) was added to reduce the cell size of the foam produced. No talc was necessary in Test 4.2 as the cell size was desirably small without it.

As seen in Table D, the CG1/LDPE blend produced a substantially closed-cell foam of satisfactory quality. The blend foamed at a temperature at which foams comprised only of LDPE resin typically foam (106° C.). The ZN1/LDPE blend foamed at the same temperature as the ZN1 resin foams (115° C.). The ZN1/LDPE blend produced a foam having all undesirable characteristics: smaller cross-sectional size, higher density, smaller cell size without nucleator, and more open cells.

TABLE D

| | | Foams of Resin Blends | | | | | | |
|---|---|---|---|---|---|---|---|---|
| Test No. | Resin Type[1] | Blend Ratio[2] | Foam Temp[3] | Foam Size[4] | Foam Dens[5] | Cell Size[6] | Open Cell[7] | Foam Qual[8] |
| 4.1 | CG1/LDPE | 50/50 | 106 | 0.85 | 56 | 0.68 | 15 | S |
| 4.2* | ZN1/LDPE | 50/50 | 115 | 0.46 | 61 | 0.36 | 51 | P |

*Not an example of the present invention
[1]Refer to Table A for the characteristics of the resins
[2]Weight ratio of two polymers
[3-8]Same as in Table B

EXAMPLE 5

Ethylenic polymer foams according to the present invention were prepared with a blend of a CGCT and LDPE and a blend of a CGCT resin (resin CG1) and ethylene acrylic acid (EAA) resin. They were compared with an ethylenic polymer foam prepared with a blend of a conventional LLDPE resin (ZN1) and each of CG1 and the EAA resins.

The equipment and operating procedure were substantially the same as Example 4. The LDPE resin used was the same as in Example 4 and the EAA resin was PRIMACOR ® 1410 resin (The Dow Chemical Company). The EAA resin has 9 percent acrylic acid by weight copolymerized therein and a 1.4 melt index. Different blend-ratios were used than in Example 4. Isobutane was used as the blowing agent at a 1.5 mpk level, and 0.1 pph talc was added for cell size control. Two pph of stearyl stearamide was added for dimensional stability. The data are summarized in Table E.

The CGCT resin (CG1) blends made better foams than corresponding blends with conventional LLDPE (ZN1) resins. The CG1/EAA foam was soft and flexible. The CG1/EAA foam may find applications in sports and leisure as well as in cushion packaging.

TABLE E

| | | Foams of Resin Blends | | | | | | |
|---|---|---|---|---|---|---|---|---|
| Test No. | Resin Type[1] | Blend Ratio[2] | Foam Temp[3] | Foam Size[4] | Foam Dens[5] | Cell Size[6] | Open Cell[7] | Foam Qual[8] |
| 5.1 | CG1/LDPE | 20/80 | 107 | 0.77 | 39 | 1.08 | 13 | S |
| 5.2 | CG1/EAA | 20/80 | 99 | 0.61 | 66 | 0.85 | 32 | S |
| 5.3* | ZN1/LDPE | 20/80 | 112 | 0.62 | 49 | 0.68 | 22 | P |
| 5.4* | ZN1/EAA | 20/80 | 107 | 0.60 | 80 | 0.45 | 71 | P |

*Not an example of the present invention
[1]Refer to Table A for the characteristics of the resins
[2]Weight ratio of two polymers
[3-8]Same as in Table B

EXAMPLE 6

Ethylenic polymer foams of the present invention were prepared with a 20/80 blend by weight of CGCT resin (resin CG2) and an intermediate density polyethylene (IDPE) resin prepared by the high pressure process.

The equipment and operating procedure was substantially the same as in Example 1. The IDPE resin had a melt index of 6.0, density of 0.930 g/cc, and foamed at 112° C. on the extrusion equipment. GMS (2 pph) and talc (0.1 pph) were added for control of dimensional stability and cell size, respectively. The blend was expanded with 1.5 mpk isobutane.

The blend foamed well at 114° C., which is far lower than the foaming temperature of CG2 resin alone (120° C.). The foam was of satisfactory quality with a cross-section of 0.89 cm$^2$, a density of 35 kg/m$^3$, and an open cell content of 21 percent.

EXAMPLE 7

Ethylenic polymer foams of the present invention were prepared with two additional CGCT resins, CG5 and CG6.

The foaming equipment and procedure was substantially the same as in Example 1. 1.8 pph GMS was added for foam dimensional stability, and 0.05 pph talc was added for cell size control. A blowing agent mixture of 75/25 by mole isobutane/n-butane was employed. Temperatures maintained at the extruder zones up to the metering zone were the same in both tests; 150° C. at the feeding zone, 160° C. at the melting zone, and 180° C. at the metering zone. Good foams were made when the melts were cooled down to the optimum temperatures in both tests.

As shown in Table F, the foams were of relatively large size and good quality. The foams initially shrank to some degree, but recovered well. The foam made in Test 7.2 showed excellent quality and satisfactory dimensional stability. The foam recovered to 89 percent of the initial volume within two weeks after extrusion.

TABLE F

| Test No. | Resin Used[1] | BA Level[2] | Foam Temp[3] | Foam Size[4] | Foam Dens[5] | Cell Size[6] | Open Cell[7] | Foam Qual[8] |
|---|---|---|---|---|---|---|---|---|
| 7.1 | CG5 | 1.7 | 54 | 1.01 | 53 | 1.35 | 43 | G |
| 7.2 | CG6 | 1.7 | 96 | 0.89 | 36 | 0.65 | 17 | E |

[1-8]Same as in Table B

EXAMPLE 8

Ethylenic polymer foams of the present invention were prepared from a CGCT (CG6) resin and a blend with an LDPE resin.

The apparatus was a 45 mm (1¾ inch) screw type extruder having substantially the same configuration as that of Example 1. This larger extruder has one additional zone between the feeding and melting zone, such as a transition zone, and is equipped with a gap-adjustable die having 12.7 mm (0.5 inch) width. The operating procedure was substantially the same as that of Example 1.

The CG6 resin was foamed by itself in Test 8.1 and in an 80/20 by weight LDPE6/CG6 blend in Test 8.2. The blowing agent was a 75/25 by mole mixture of isobutane and normal butane. The LDPE resin was the same as in Example 4. For comparison, the LDPE resin was also foamed in Test 8.3. The blowing agent level was 1.7 mpk in Test 8.1 and 1.5 mpk in both Tests 8.2 and 8.3. GMS was employed at 1.8 pph for control of foam dimensional stability. HYDROCEROL (Trademark of Boehlinger Ingelheim KG, Germany) CF-20 brand citric acid/sodium bicarbonate type nucleating agent was employed at 0.4 pph in Test 8.1 and at 0.3 pph in Tests 8.2 and 8.3 to control cell size. The temperatures maintained at the extruder zones throughout the tests were 100° C. at the feeding zone, 135° C. at the transition zone, 165° C. at the melting zone, and 185° C. at the metering zone. The temperatures at the mixing and cooling zone were varied from test to test to effect optimum foam expansion. The temperature maintained at the mixing zone was 180° C. in Test 8.1 and 165° C. in both Test 8.2 and 8.3.

Excellent foams were produced from both the CGCT resin and an 80/20 blend of LDPE/CG6. All foams exhibited excellent dimensional stability. The characteristics of the foams produced in this example are represented in Table G.

The foam of Test 8.1 was very soft due to its high level of open cells. The foam was easily squeezed due to its very low compressive strength. The foam recovered from a compressive deflection somewhat sluggishly. This kind of foam may be useful in certain applications such as in ear plugs. The results indicated a foam of a CGCT resin can readily be made into an open cell foam as well as a closed cell foam as in Test 7.2 of Example 7. In both Tests 8.2 and 8.3, substantially closed-cell foams having good cellular integrity were achieved.

The foam made from an LDPE/CG6 showed advantages in both skin quality and properties over a foam made from LDPE resin evident from Table G. Incorporating 20 percent by weight CGCT LLDPE resin in an LDPE resin resulted in a foam about 3 times tougher than a foam of 100 percent LDPE resin, and also improved the skin quality of the foam. Such a tough foam is expected to die cut better and be durable in repeated use of packaging material.

TABLE G

| Test No. | Foam Temp[1] | Foam Size[2] | Foam Dens[3] | Cell Size[4] | Open Cells[5] | Skin Qual[6] | Comp Strg[7] | Tens Strg[8] | Tens Elong[9] |
|---|---|---|---|---|---|---|---|---|---|
| 8.1 | 98 | 13.6 | 28 | 1.98 | 78 | E | 7.6 | 121 | 261 |
| 8.2 | 107 | 6.1 | 24 | 1.22 | 8 | E | 62.7 | 231 | 182 |
| 8.3* | 112 | 5.6 | 25 | 1.32 | 10 | H | 71.0 | 210 | 66 |

*Not an example of the present invention
[1]The optimum melt temperature providing the best foam in degrees Celsius
[2]Cross-sectional area of foam body in square centimeters
[3]Density of one month-old foam body in kilograms per cubic meters
[4]Cell size in millimeters determined per ASTM D3576
[5]Open cell content in percentage determined per ASTM 2856-A
[6]Quality of foam skin: E = excellent; H = hairy with die sloughs (undesirable)
[7]Average of 3 directional compressive strength at 25% deflection in kilopascals determined per ASTM D3575
[8]Tensile strength at break in kilopascals determined per ASTM D412
[9]Tensile elongation in percentage determined per ASTM D412

1.

While embodiments of the foam and the process for making it of the present invention have been shown with regard to specific details, it will be appreciated that depending upon the manufacturing process and the manufacturer's desires, the present invention may be modified by various changes while still being fairly within the scope of the novel teachings and principles herein set forth.

What is claimed is:

1. A process for making an ethylene polymer foam structure, comprising:
   a) heating an ethylene polymer material to form a melt polymer material, the ethylene polymer material comprising a substantially linear ethylene polymer having:
   i) a melt flow ratio, $I_{10}/I_2$, $\geq 5.63$;
   ii) a molecular weight distribution, $M_w/M_n$, defined by the equation: $M_w/M_n \leq (I_{10}/I_2) - 4.63$; and
   iii) a critical shear rate at onset of surface melt fracture of at least 50 percent greater than the critical shear rate at the onset of surface melt fracture of a linear olefin polymer having about the same $I_2$ and $M_w/M_n$;
   b) incorporating into the melt polymer material at an elevated pressure a blowing agent; and
   e) expanding the foamable gel at a reduced pressure to form the foam structure.

2. The process of claim 1, wherein the $M_w/M_n$ is about 3.5 or less.

3. The process of claim 1, wherein the $M_w/M_n$ is from about 1.5 to about 2.5.

4. The process of claim 1, wherein the substantially linear ethylene polymer having from about 0.01 to about 3 long chain branches/1000 carbons along the polymer backbone.

5. The process of claim 4, having about 0.01 to about 1 long chain branches/1000 carbons along the polymer backbone.

6. The process of claim 4, having about 0.05 to about 1 long chain branches/1000 carbons along the polymer backbone.

7. The process of claim 1, wherein the substantially linear ethylene polymer is an ethylene/alpha-olefinic copolymer.

8. The process of claim 7, wherein the substantially linear ethylene polymer is a copolymer of ethylene monomer and a comonomer selected from the group consisting of 1-octene, 1-butene, 1-hexene, and 4-methyl-1-pentene.

9. The process of claim 1, wherein the substantially linear ethylene polymer is an ethylene homopolymer.

10. The process of claim 1, wherein the foam composition is 80 percent or more closed-cell.

11. The process of claim 1, wherein the foam composition has a density of less than 250 kilograms per cubic meter.

12. The process of claim 1, wherein the ethylene polymer material comprises greater than 70 percent by weight of ethylenic ethylene monomeric units.

13. The process of claim 1, wherein the foam composition is an extruded foam composition.

14. The process of claim 1, wherein the $I_{10}/I_2$ is about 8 or more.

15. The process of claim 1, wherein the $I_{10}/I_2$ is about 9 or more.

16. The process of claim 1, wherein the rheological processing index is less than or equal to 70 percent of that of a linear ethylene polymer which lacks long-chain branching at about the same $I_2$ and $M_w/M_n$.

17. The process of claim 1, wherein the ethylene polymer material further comprises a low density polyethylene.

18. The process of claim 1, wherein the ethylene polymer material further comprises a linear low density polyethylene.

19. The process of claim 1, wherein the ethylene polymer material further comprises an ethylene/acrylic acid copolymer.

20. The process of claim 1, wherein the foam structure comprises a blowing agent selected from the group consisting of isobutane, 1,1-difluoroethane, and mixtures of the foregoing.

21. The process of claim 1, wherein the ethylene polymer material comprises greater than 50 percent by weight ethylene monomeric units.

22. The process of claim 1, wherein the foam structure is in the form of a foam bead.

23. A process for making an ethylene polymer foam structure in the form of a foam bead, comprising:
   a) forming a suspension of discrete particles of an ethylene polymer material in a liquid in which it is substantially insoluble and at an elevated temperature and pressure, the ethylene polymer material comprising a substantially linear ethylene polymer having:
   i) a melt flow ratio, $I_{10}/I_2$, $\geq 5.63$;
   ii) a molecular weight distribution, $M_w/M_n$, defined by the equation: $M_w/M_n \leq (I_{10}/I_2) - 4.63$; and
   iii) a critical shear rate at onset of surface melt fracture of at least 50 percent greater than the critical shear rate at the onset of surface melt fracture of a linear olefin polymer having about the same $I_2$ and $M_w/M_n$;
   b) impregnating a blowing agent into the discrete particles at an elevated temperature and pressure;
   e) discharging the discrete particles into an atmosphere of reduced pressure to form the foam beads.

* * * * *

UNITED STATES PATENT AND TRADEMARK OFFICE
CERTIFICATE OF CORRECTION

PATENT NO. : 5,340,840
DATED : August 23, 1994
INVENTOR(S) : Chung P. Park, James C. Stevens, George W. Knight It is certified that error appears in the above-identified patent and that said Letters Patent is hereby corrected as shown below:

In the Abstract, line 4, please delete "$I_{10}I_2$" and insert --$I_{10}/I_2$--.
In Column 23, line 21, please delete "e)" and insert --c)--.
In Column 24, line 3, please delete "ethylenic".
In Column 24, line 50, please delete "e)" and insert --c)--.

Signed and Sealed this

Twenty-seventh Day of June, 1995

Attest:

BRUCE LEHMAN

Attesting Officer

Commissioner of Patents and Trademarks